(12) United States Patent
Rüter et al.

(10) Patent No.: US 6,188,591 B1
(45) Date of Patent: Feb. 13, 2001

(54) SYSTEM FOR SUPPLYING ELECTROMOTIVE CONSUMERS WITH ELECTRIC ENERGY

(75) Inventors: Bernd Rüter, Hamburg; Wolfgang Rzadki, Glinde, both of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/508,398

(22) PCT Filed: Sep. 9, 1998

(86) PCT No.: PCT/DE98/02664

§ 371 Date: Mar. 10, 2000

§ 102(e) Date: Mar. 10, 2000

(87) PCT Pub. No.: WO99/13550

PCT Pub. Date: Mar. 18, 1999

(30) Foreign Application Priority Data

Sep. 11, 1997 (DE) .............................................. 197 39 917

(51) Int. Cl.[7] .................................................... H02M 7/00
(52) U.S. Cl. .................................. 363/65; 363/69; 363/71
(58) Field of Search ................................ 363/65, 69, 70, 363/71, 72

(56) References Cited

U.S. PATENT DOCUMENTS

| | | | |
|---|---|---|---|
| 4,074,146 | * | 2/1978 | Buonavita .............................. 307/60 |
| 4,328,429 | * | 5/1982 | Kublick ................................. 307/58 |
| 4,520,275 | * | 5/1985 | Marusik ................................ 307/64 |
| 4,635,178 | * | 1/1987 | Greenhalgh ............................ 363/65 |
| 4,920,309 | * | 4/1990 | Szepesi ................................. 323/269 |
| 4,924,170 | * | 5/1990 | Henze .................................. 323/222 |
| 5,177,372 | | 1/1993 | Yajima et al. ......................... 307/85 |
| 5,200,643 | | 4/1993 | Brown ................................... 307/53 |
| 5,334,463 | | 8/1994 | Tajima et al. .......................... 429/9 |

FOREIGN PATENT DOCUMENTS

| | | | |
|---|---|---|---|
| 39 32 437 | 10/1990 | (DE) | ................................. G05F/1/56 |
| 196 20 444 | 9/1996 | (DE) | ................................. H02J/1/10 |

* cited by examiner

Primary Examiner—Peter S. Wong
Assistant Examiner—Bao Q. Vu
(74) Attorney, Agent, or Firm—Kenyon & Kenyon

(57) ABSTRACT

A DC voltage supply network is described for electric-motor loads, in particular on a ship. A plurality of electricity generation sets are connected in parallel on an output side, and a controllable rectifier or a DC voltage controller is connected downstream of an output of each electricity generation set and has a control input for connection of a voltage regulator. An output of the controllable rectifier or the DC voltage is coupled to an input of the voltage regulator in order to supply a voltage actual value signal and an additional signal, and is connected to the network in order to supply it. The loads are in each case connected to the network via an inverter which can be controlled via a control input by a regulator. In addition to an actual value and the nominal value, an input of the regulator is supplied with an additional signal which is derived from the inverter input voltage and/or the network voltage. When using at least two loads that are coupled to one another, the network provides that, in addition to the actual value and the nominal value, the input of the regulator is supplied with an additional signal, which is derived from the input current flowing from an network into the inverter, or from a relevant power.

13 Claims, 1 Drawing Sheet

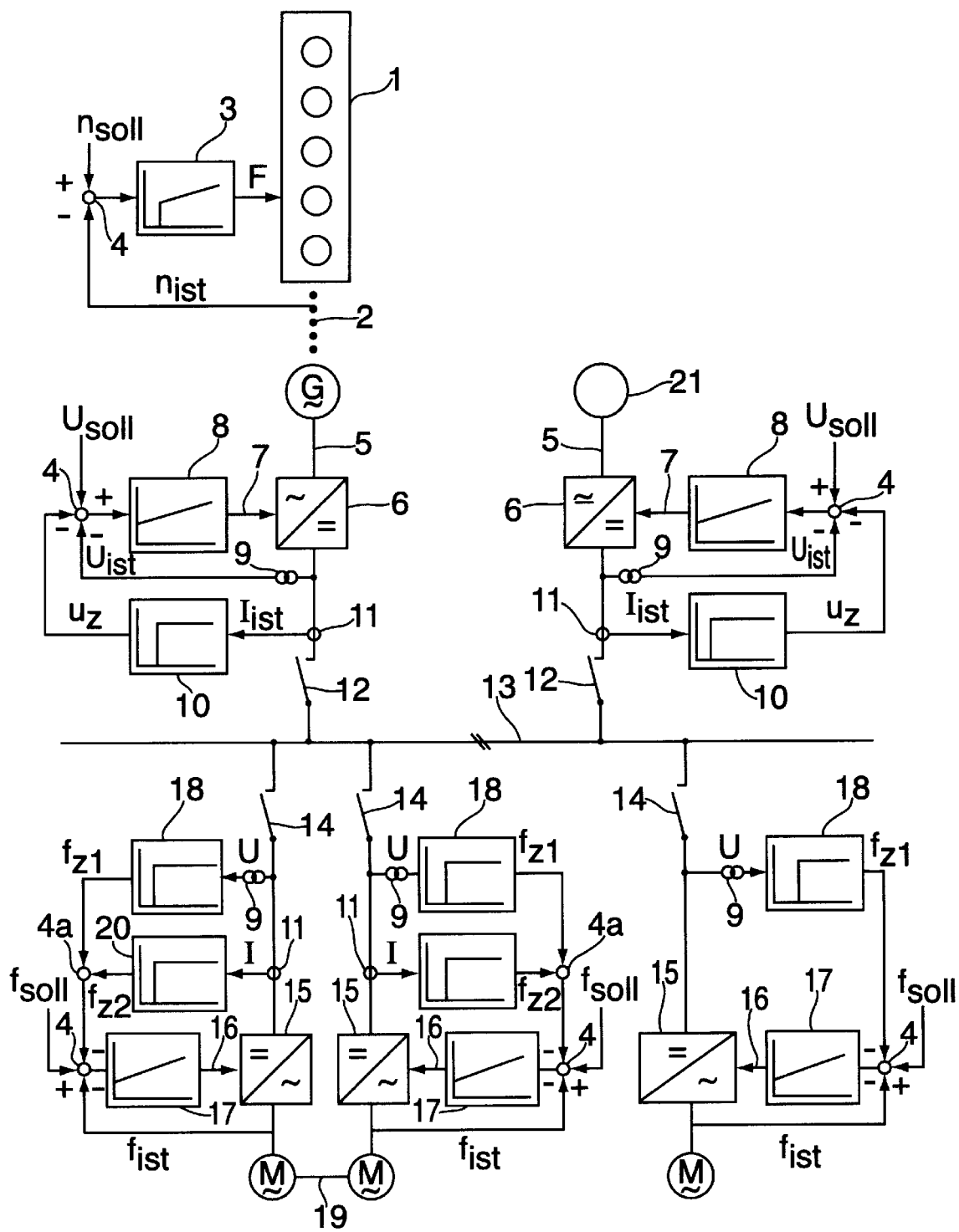

SYSTEM FOR SUPPLYING ELECTROMOTIVE CONSUMERS WITH ELECTRIC ENERGY

FIELD OF THE INVENTION

The present invention relates to systems for supplying electric-motor loads with electrical energy, for example via the electrical on-board network of a ship or aircraft. According to one particular aspect, a plurality of electricity sources can be operated in parallel, for example diesel engines or gas turbines coupled to AC generators. Furthermore, control loops are proposed for network stabilization and for load sharing between loads that are coupled to one another.

BACKGROUND INVENTION

Conventional separate networks of this type, for example, include three-phase networks with synchronous generators. The real power is distributed via the rotation-speed frequency droop of the rotation-speed regulators for the diesel engines or turbine drives. The reactive load is distributed via the voltage droop of the generator voltage regulator. Droop devices as well as load sharing when two generators are operated in parallel, are described in the technical information document ASI NMA/TNG3 from Siemens AG, entitled "THYRIPART-Erregung in bürstenlosen Siemens-Synchrongeneratoren" [THYRIPART Excitation in Brushless Siemens Synchronous Generators] by Joachim Frauenhofer. The entire contents of this document are hereby included and are presupposed for the following statements.

In three-phase separate networks, it is conventional for an additional voltage value to be generated for load sharing of parallel-operating generators, from the output current of the generator, for the nominal/actual value comparison input of a voltage regulator. The additional voltage value allows the generator voltage to be reduced in proportion to the rising reactive current. However, this is dependent on the capability to influence the generator voltage externally from a separate functional component. Such DC generators or AC generators whose voltage can be controlled or regulated, have the disadvantages, however, that they are physically voluminous, heavy and costly to manufacture. Furthermore, there is a considerable requirement for intrinsically autonomous energy generation and power supply separate networks which are distinguished by being physically small and compact as well as being light in weight, particularly with regard to electricity generators.

U.S. Pat. No. 5,200,643 describes a power supply network that has a plurality of DC supply sources, which feed into amplifiers that have control inputs. Signals for the output actual voltage and the output actual current are combined with a reference signal. The aim in this case is to provide a signal for the control error, with the output voltage of each source being regulated.

U.S. Pat. No. 5,334,436 describes a fuel battery. However, when a plurality of sources are paralleled without any higher-level regulating device it is impossible to achieve sufficiently good and desirable load sharing or to ensure satisfactory network stability.

In order to overcome the disadvantages resulting from the above-mentioned patents, and to solve the equivalent problems, the present invention proposes an energy generation system, a power supply network, and a control loop.

SUMMARY OF THE INVENTION

The present invention provides for a DC voltage supply network to be used for supply networks in aircraft or vehicles, in particular ships, instead of a three-phase supply network, whose voltage can be regulated by means of a controllable rectifier or a DC voltage controller. On the one hand, this is associated with a considerable reduction in weight. On the other hand, no wattless component can be transported in this network, and thus does not result in any problems. All the loads can be coupled to this supply network, if necessary via converters.

This according to the present invention represents a departure from the approach of direct voltage regulation via the excitation of the generators using, instead of this, a rectifier, in particular a transistor rectifier, as a control element for a compensating voltage. This avoids supplying any wattless component into the network. Dynamic network load relief can be carried out without any wattless component by means of the arrangement according to the present invention. A controllable, voltage-regulated rectifier is used that can produce a constant output voltage from alternating current. The real-power distribution can be adjusted by varying, in particular parallel shifting, the droop characteristic or voltage droop for the corresponding rectifier appliance.

The present invention opens up the possibility of using one or more AC voltage generators, which are each excited by permanent magnets, with a low rotating mass and downstream of which a controllable, pulsed transistor rectifier is connected. Particularly when synchronous machines that have permanent-magnet excitation on the rotor are used, the physical size of the generator can be considerably reduced. The generators are driven, for example, by four-stroke diesel engines with a high boost pressure. Such engines can accept load only as quickly as the volume of boost air supplied by the exhaust-gas turbo charger rises.

According to a further embodiment of the present invention, which is based on energy sources whose speed or rotation speed is regulated, a regulator with a proportional-integral characteristic is proposed for this purpose. This allows, for example, the power capacity of the diesel engine as an energy source falls. This energy source stalls, and the network collapses.

With the method for load distribution, on which the system according to the present invention is based, a voltage droop occurs that results in a desired load distribution in that an additional voltage value for the nominal/actual value input of the voltage regulator is produced from the output current of the generator. The additional voltage value allows the voltage to fall in proportion to the rising rectifier output current. This voltage droop is assigned individually to each generating set, which comprises, for example, a diesel engine, generator and rectifier, irrespective of its power capacity. There is no need for any higher level device for load distribution.

Shifting the droop characteristic parallel results in a possibly desired, different load distribution. This is necessary in order to parallel the generators without resulting in a sudden load change on the drive machine, the diesel engine or any other energy source. Manual control of the paralleling of two or more generators is thus possible.

When a system or separate network according to the present invention is loaded predominantly with drives whose rotation speeds are regulated, then any sudden load change is passed on, without being reduced, via the generators to the diesel engines as kinetic energy sources. A diesel engine can accept such a sudden load change initially only by means of the kinetic energy of its rotating mass and the rotating mass of the generator and then, by means of its rotation-speed regulator, it can accept a load level corresponding to the amount of excess combustion air. If the sudden load change is greater than the instantaneous capability to accept the load, the diesel rotation speed falls, and thus the power capacity of the diesel engine as an energy source falls. This energy source stalls, and the network collapses.

In a known three-phase separate network with three-phase motors as a load, a sudden load change leads to a reduction in the rotation speed of the diesel engine, and thus to a frequency reduction. This results in a reduction in the general separate network load, depending on the load characteristic of the drive machine, and the network receives less power and is thus stabilized.

In contrast, the present invention is based on the achieving an appropriate stabilization behavior for energy generation and power supply systems, in which a DC voltage rail is arranged as the power supply network. The power supply network according to the present invention achieves the advantage that even when it is supplying DC voltage, the network can be stabilized with the same quality as the conventional three-phase separate network. Thus, for network stabilization, an additional value for the nominal/actual value input of the rotation-speed regulator of the respective drive or load is produced from the input voltage of the drives or loads and allows the rotation speed to fall in proportion to, or corresponding to, the falling network voltage.

A frequency/rotation-speed regulator is advantageous for this purpose, in which a transfer function that has proportional/integral characteristic is implemented.

The arrangement of a frequency droop element and/or a voltage converter is expedient in order to derive the additional frequency signal value. The input of the element or the converter is connected to the inverter input voltage and/or network voltage, while its output is connected to the input of the frequency/rotation-speed regulator. A proportional response is suitable for use as the transfer function or transmission characteristic of the frequency droop element or the frequency converter.

In separate networks, it is desirable that electric-motor loads, which are coupled to one another via an electrical or mechanical shaft, or that electric-motor converters, which are connected in parallel on the load side, share the load in proportion to their rated power. To this end, it is conventional in three-phase separate networks for asynchronous motors with a converter to share the common load automatically on the basis of their slip characteristic.

The control loop according to the present invention allows the load distribution to be achieved in an equivalent manner in separate networks with coupled loads which are supplied from a DC voltage network.

An additional frequency signal value for the frequency or rotation-speed regulator is produced from the input power for the load distribution of drives or converters that actuate the latter and are coupled on the load side. The additional frequency signal value allows the frequency or rotation speed to fall as the input current or input power rises.

In order to derive the frequency or rotation-speed additional signal value, a frequency droop module or element and/or current/voltage converter is/are advantageously arranged such that it or they are connected on the input side to the input current of the inverter and at its or their outputs to the input of the frequency/rotation-speed regulator. A proportional response is suitable for use as the transmission characteristic for the frequency droop or the current/frequency converter.

The additional signal values described above are used to stabilize dynamic processes. They allow parallel operation without any higher-level regulation. Thus, in conjunction with the DC supply, it is thus likewise possible to achieve the same response as that obtained with conventional separate networks using diesel generators and with the load being shared via the rotation-speed droop of the diesel engines. If the described regulator actions are undesirable in the steady state, the voltage of the separate network can be returned to the desired value again by means of a slow compensating regulator, using a common additional nominal value for all the generators. This can be done as soon as the diesels can once again provide the power required for this purpose. Additional nominal values also allow a non-proportional load distribution to be provided.

The present invention proposes a novel approach for a DC voltage separate network with AC generators, controllable rectifiers and AC drives, which are operated via inverters with rotation-speed regulation. This allows load distribution and network stabilization in the same way as in a conventional three-phase separate network.

BRIEF DESCRIPTION OF THE DRAWINGS

The FIGURE shows a schematic block diagram of an embodiment of the present invention.

DETAILED DESCRIPTION

The DC voltage separate network according to the present invention has a first kinetic energy source 1, for example a diesel engine, whose rotation speed may be variable over wide ranges. Via an output drive shaft 2 (indicated schematically by dots), it drives a permanently associated AC generator G, which is preferably excited by permanent magnets. The rotation speed of the energy source 1 is regulated by a PI regulator 3 whose output produces a regulation or control variable, for example for a fuel supply F for the diesel engine 1, as the energy source. The rotation-speed value nact is sampled on the output drive shaft 2 and is supplied to an adder 4, in which the rotation-speed actual value nact is compared with a rotation-speed nominal value nnom. The control difference is then supplied to the input of the PI regulator.

One or more further electricity generation units 21 are provided in parallel with this electricity generation set. This may be, for example, a physically identical diesel set, or alternatively a set with a different rating or completely different electricity generation units, such as fuel cells. Either an AC voltage as in the case of a diesel set, or a DC voltage as, for example, in the case of a fuel cell, may be supplied at the output of the electricity generator 21.

The output lines or phases 5 of the generators G, 21 are connected to the inputs of the respective rectifier appliances or DC voltage controllers 6. These each have a voltage control input 7, via which the relevant output voltage can be adjusted. In the present case, this is done via respective voltage regulators 8, to whose inputs a voltage nominal value unom together with a voltage actual value uact and an additional voltage value uz are applied. The voltage actual value is obtained via a voltage converter 9 which is connected to the rectifier or DC voltage controller output, and the additional voltage value is obtained via a voltage droop element 10, whose input is supplied from a current transformer 11. The latter is likewise directly connected to the rectifier output. Switching elements 12 are connected downstream of the junction point to the current transformers 11, which switching elements each lead to a common DC voltage rail 13.

Electric-motor loads M are coupled in parallel to this rail 13 via further switching elements 14, and inverters 15 connected downstream from them. The output frequency of the inverters 15 can be adjusted via a separate frequency control input 16 from an external functional component, in the present case a frequency/rotation-speed regulator 17. Its adder 4 is supplied externally—in the same way as in the case of the voltage regulator 8 or PI regulator 3 mentioned above—with the frequency nominal value fnom. The frequency actual value fact is tapped off directly from the connection between the inverter output and the input of the respective, electric-motor load M.

As can be seen from the circuitry of the right-hand load M in the drawing, the adder 4 of the respective frequency regulator 17 and—as a further nominal or actual value—the output of a frequency droop element 18 that is used for network stabilization are also supplied with the additional frequency output signal fz1. The input signal for the network stabilization frequency droop element 18 is obtained from a voltage converter 9, whose input is connected directly to the DC voltage rail 13.

If the electric-motor loads M are coupled via an electrical or mechanical shaft corresponding to the (schematically shown) coupling connection 19, a respectively arranged further frequency droop element 20 is also used for load distribution. The load distribution frequency droop element 20 is connected on the input side to a respective current transformer 11, which produces a current input value for the frequency droop element from the supply lead of the relevant inverter 15, which is coupled to the DC voltage rail 13. According to the exemplary embodiment, the latter uses a P-transmission characteristic to form a second additional frequency output signal fz2 which, with regard to the loads M which are coupled 19 to one another, is in each case logically linked in a separate adder 4a to the first additional frequency output signal fz1, mentioned above, from the network stabilization frequency droop element 18. The result of this logical linking is then input to the nominal/actual-value comparison input and corresponding adder 4 of the respective frequency regulator 17. The latter uses this to form a control variable for the separate frequency control input 16 of the respective inverter 15, resulting in regulation with combined network stabilization and the desired load distribution.

What is claimed is:

1. A system for producing electrical energy for supplying electric-motor loads, comprising:
    a power supply network for supplying the electric motor loads;
    a plurality of electricity generation sets operating in parallel and supplying in parallel the power supply network via respective outputs;
    one of a controllable rectifier and a DC voltage controller connected downstream of the respective output of each of the electricity generation sets, the one of the controllable rectifier and the DC voltage controller being coupled to the power supply network to supply the power supply network;
    a voltage regulator coupled to a control input of the one of the controllable rectifier and the DC voltage controller, an output of the one of the controllable rectifier and the DC voltage controller being coupled to an input of the voltage regulator to supply a voltage actual value signal, the output of the one of the controllable rectifier and the DC voltage controller being coupled to an additional signal generated for sharing a total load between the electricity generation sets so that a supply voltage is reduced as at least one of a supply current rises and power emitted to the power supply network increases.

2. The system according to claim 1, wherein the electric-motor loads are supplied in a ship for drive units and other loads.

3. The system according to claim 1, wherein the electricity generation sets are kinetic energy sources including at least one of diesel engines and AC generators.

4. The system according to claim 1, wherein the sharing of the total load between the electricity generation sets is balanced.

5. The system according to claim 3, wherein the AC voltage generators are excited by permanent magnets.

6. The system according to claim 1, further comprising:
    a regulator having a proportional-integral characteristic, one of a speed and a rotation speed of the kinetic energy sources being regulated by the regulator.

7. A power supply network for at least one load, the at least one load including at least one electricity generation sets operating in parallel, the power supply network comprising:
    an inverter coupling the at least one load to the power supply network;
    a regulator regulating at least one of a frequency and a rotation-speed and controlling the inverter via a control input, an input of the regulator being supplied with at least one of a frequency actual value and a rotation-speed actual value of the inverter, at least one of a frequency nominal value and a rotation-speed nominal value for stabilization of the power supply network, and at least one of a frequency additional signal and a rotation-speed additional signal, the at least one of the frequency additional signal and the rotation-speed additional signal being derived from at least one of an input voltage of the inverter and a network voltage, the at least one of the frequency additional signal and the rotation-speed additional signal being generated so that at least one of the frequency and the rotation speed of the at least one load is reduced as at least one of the network voltage and the input voltage of the inverter falls.

8. The power supply network according to claim 7, wherein the at least one load is in a ship.

9. The power supply network according to claim 7, wherein the regulator has a proportional-integral transmission characteristic.

10. The power supply network according to claim 7, further comprising:
    a voltage converter having at least one of a proportional transmission and a frequency droop element, the voltage converter being arranged to derive the at least one of the frequency additional signal and the rotation-speed additional signal, an input of the frequency droop element being coupled to at least one of the input voltage of the inverter and the network voltage, an output of the frequency droop element being coupled to the input of the regulator.

11. A control loop for at least two loads at least one of electrically and mechanically coupled to one another and operated from at least one power network, comprising:
    an inverter coupling the at least two loads to the at least one power network;
    a regulator for regulating at least one of a frequency and a rotation-speed, the regulator controlling the inverter via a control input, an input of the regulator being supplied with at least one of a frequency actual value and a rotation-speed actual value of the inverter, at least one of a frequency nominal value and a rotation-speed nominal value, and at least one of a frequency additional signal value and a rotation-speed additional signal derived from an input current flowing from at least one of the at least one power network into the inverter and a relevant power, at least one of the frequency additional signal value and the rotation speed additional signal being generated so that at least one of the frequency and the rotation speed is reduced as the at least one of the input current and an input power of the inverter rises.

12. The control loop according to claim 11, further comprising:

a current/voltage converter having at least one of a proportional transmission characteristic and a frequency droop module, the current/voltage converter being arranged to derive at least one of the frequency additional signal and the rotation-speed additional signal, an input of the frequency droop module being coupled to the input of the regulator.

13. A method for producing electrical energy, comprising:

supplying electric-motor loads via a power supply network;

operating in parallel a plurality of electricity generation sets, the electricity generation sets supplying in parallel the power supply network via respective outputs;

providing one of a controllable rectifier and a DC voltage controller downstream of the respective output of each of the electricity generation sets, the one of the controllable rectifier and the DC voltage controller being coupled to the power supply network to supply the power supply network;

supplying a voltage actual value signal to an input of a voltage regulator via the one of the controllable rectifier and the DC voltage controller, the voltage regulator being coupled to a control input of the one of the controllable rectifier and the DC voltage controller; and sharing a total load between the electricity generation sets so that a supply voltage is reduced as at least one of a supply current rises and power emitted to the power supply network increases, the sharing being performed as a function of an additional signal at an output of the one of the controllable rectifier and the DC voltage controller.

* * * * *